United States Patent
Rauber et al.

(10) Patent No.: US 10,059,438 B2
(45) Date of Patent: Aug. 28, 2018

(54) HUB ASSEMBLY WITH GREASE LUBRICATED ROLLER BEARING AND TENSION-TORSION STRAP

(75) Inventors: Richard Rauber, Arlington, TX (US); Frank B. Stamps, Colleyville, TX (US); David Popelka, Colleyville, TX (US); Patrick Tisdale, Roanoke, TX (US); Tom Donovan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 983 days.

(21) Appl. No.: 13/337,215

(22) Filed: Dec. 26, 2011

(65) Prior Publication Data

US 2013/0164129 A1  Jun. 27, 2013

(51) Int. Cl.
*B64C 27/33* (2006.01)
*B64C 11/04* (2006.01)
*B64C 27/35* (2006.01)
*B64C 29/00* (2006.01)

(52) U.S. Cl.
CPC .............. *B64C 27/33* (2013.01); *B64C 11/04* (2013.01); *B64C 27/35* (2013.01); *B64C 29/0033* (2013.01)

(58) Field of Classification Search
CPC ................. B64C 27/33; B64C 27/322; B64C 2700/6283; B64C 11/04; B64C 27/35
USPC ............. 416/1, 98, 102, 103, 104, 135, 140, 416/210 R, 239
See application file for complete search history.

(56) References Cited

U.S. PATENT DOCUMENTS

| | | | | |
|---|---|---|---|---|
| 2,648,387 | A | * | 8/1953 | Doman .................... 416/114 |
| 2,672,941 | A | * | 3/1954 | Jovanovich ............. B64C 27/37 |
| | | | | 416/103 |
| 2,961,051 | A | * | 11/1960 | Wilford et al. ............. 416/102 |
| 3,297,094 | A | * | 1/1967 | Kisovec ..................... 416/89 |
| 3,545,880 | A | * | 12/1970 | Mouille ..................... 416/114 |
| 3,885,887 | A | * | 5/1975 | Desjardins .............. B64C 27/45 |
| | | | | 416/135 |
| 4,080,098 | A | * | 3/1978 | Watson ..................... 416/103 |
| 4,264,277 | A | * | 4/1981 | McCafferty ............. 416/134 A |
| 4,281,966 | A | | 8/1981 | Duret |

(Continued)

FOREIGN PATENT DOCUMENTS

| | | |
|---|---|---|
| GB | 819214 | 9/1959 |
| GB | 2082964 | 3/1982 |

(Continued)

OTHER PUBLICATIONS

European Search Report dated May 25, 2012 from counterpart EP Application No. 12158138.3.

(Continued)

*Primary Examiner* — Ninh H Nguyen
(74) *Attorney, Agent, or Firm* — James E. Walton (57) ABSTRACT

A rotary system and method to control feathering and centrifugal forces of a rotor blade during flight. The rotary system having a hub assembly, which includes a hollow yoke arm to receive a spindle section of the rotor blade. A tension-torsion strap extends through the hollow yoke arm and couples the rotor blade and the hub assembly. The method includes allowing the spindle section of the rotor blade to pivot within the hollow yoke arm and controlling rotational and centrifugal movement of the rotor blade with the tension-torsion strap.

16 Claims, 7 Drawing Sheets

(56) References Cited

U.S. PATENT DOCUMENTS

| | | | | |
|---|---|---|---|---|
| 4,345,876 A | * | 8/1982 | Schwarz | B64C 27/33 416/134 A |
| 4,455,123 A | * | 6/1984 | Sanders | B64C 27/33 416/134 A |
| 4,580,945 A | * | 4/1986 | Miller | 416/134 A |
| 4,695,227 A | * | 9/1987 | Head et al. | 416/134 A |
| 5,601,408 A | * | 2/1997 | Hunter | B64C 27/35 267/141.1 |
| 5,820,344 A | * | 10/1998 | Hamilton et al. | 416/134 A |
| 6,375,426 B1 | * | 4/2002 | Brack et al. | 416/134 A |
| 6,708,921 B2 | * | 3/2004 | Sims et al. | 244/17.11 |
| 7,845,909 B2 | * | 12/2010 | Stamps et al. | 416/134 A |
| 2008/0003106 A1 | | 1/2008 | Kismarton | |
| 2011/0274548 A1 | * | 11/2011 | Stamps et al. | 416/174 |
| 2011/0280727 A1 | | 11/2011 | Stamps et al. | |

FOREIGN PATENT DOCUMENTS

| | | | | |
|---|---|---|---|---|
| WO | 9629243 | | 9/1996 | |
| WO | WO 2008073073 A2 | * | 6/2008 | B64C 11/30 |
| WO | WO 2010128378 A2 | * | 11/2010 | B64C 27/41 |

OTHER PUBLICATIONS

CA Office Action dated Mar. 5, 2014 from counterpart CA Application No. 2,799,697.
Canadian Office Action dated Jan. 13, 2015 from counterpart CA App. No. 2,799,697.
Chinese Office Action dated Nov. 3, 2014 from counterpart CN App. No. 2012104213703.
CN Office Action dated May 20, 2015 from counterpart CN Application No. 201210421370.3.

* cited by examiner

HUB ASSEMBLY WITH GREASE LUBRICATED ROLLER BEARING AND TENSION-TORSION STRAP

BACKGROUND

1. Field of the Invention

The present application relates generally to the field of rotary systems, and more particularly, to a rotary system having a hub assembly with lubricated roller bearings and a tension-torsion strap.

2. Description of Related Art

Rotary systems are well known in the art for effectively utilizing a plurality of rotor blades to create horizontal and vertical flight. During operation, the rotor blades exert forces on the hub assembly, for example, lead/lag, feathering, centrifugal, coning, and flapping forces. In some embodiments, one or more of these forces could cause the rotary system to fail. Thus, rotary systems typically include different means for compensating these and other forces exerted on the hub assembly. For example, in some embodiments the rotary system could include elastomeric elements, spring-rate dampers, bearings, and/or other suitable means for reducing, and in some cases eliminating, the effects of these forces on the hub assembly.

Although great strides have been made in the field of rotary systems, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the rotary system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The rotary system of the present application provides significant advantageous over conventional rotary systems. In particular, the rotary system utilizes a tension-torsion strap that controls at least the centrifugal and feathering forces created by the rotor blades during flight. The rotary system is optionally provided with one or more elastomeric coning elements as means for compensating blade coning forces. The rotary system is also provided with a bearing system that allows the rotor blades to feather relative to the hub assembly. Further discussion and illustration of these features are provided below.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 1:
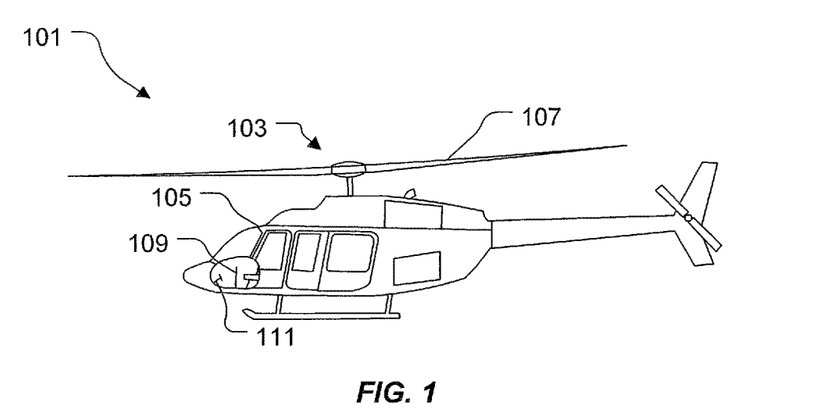
FIG. 1 is a side view of a rotary aircraft utilizing a rotary system of the present application.
Figure 2:
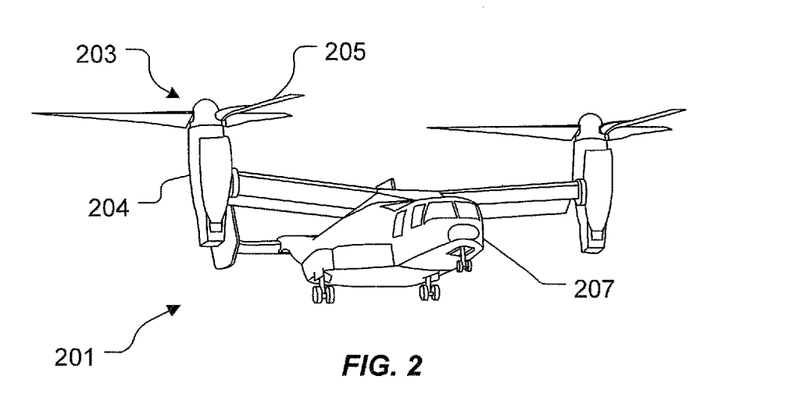
FIG. 2 is an oblique view of a tiltrotor aircraft utilizing the rotary system of the present application.

Referring now to the drawings wherein like reference characters identify corresponding or similar elements throughout the several views, FIGS. 1 and 2 show two different rotary aircraft utilizing the rotary system of the present application. FIG. 1 shows a side view of a helicopter 101, while FIG. 2 shows an oblique view of a tiltrotor aircraft 201.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107 and/or manipulate pedals 111, thus providing vertical, horizontal, and yaw flight movement.

Tiltrotor aircraft 201 includes two or more rotor systems 203 having rotor blades 205 carried by rotatable nacelles 204. The rotatable nacelles provide means for allowing aircraft 201 to takeoff and land like a conventional helicopter and for horizontal flight like a conventional fixed wing aircraft. It should be understood that, like helicopter 101, tiltrotor aircraft 201 is provided with controls, e.g., cyclic controllers and pedals, carried within fuselage 207 for controlling movement of the aircraft.

In FIGS. 3-8, various views of a rotary system 301 according to the preferred embodiment of the present application are shown. It will be appreciated that rotary system 301 provides effective means for manipulating flight direction of a rotary aircraft, and is provided with one or more unique systems and devices for controlling the forces exerted thereagainst by the rotor blades. It should be understood that both rotary systems 103 and 203 discussed above include one or more of the features of rotary system 301. Thus, the features discussed herein are incorporated in rotary systems for helicopters, tilt rotor aircraft, and other types of rotary aircraft.

Figure 3:
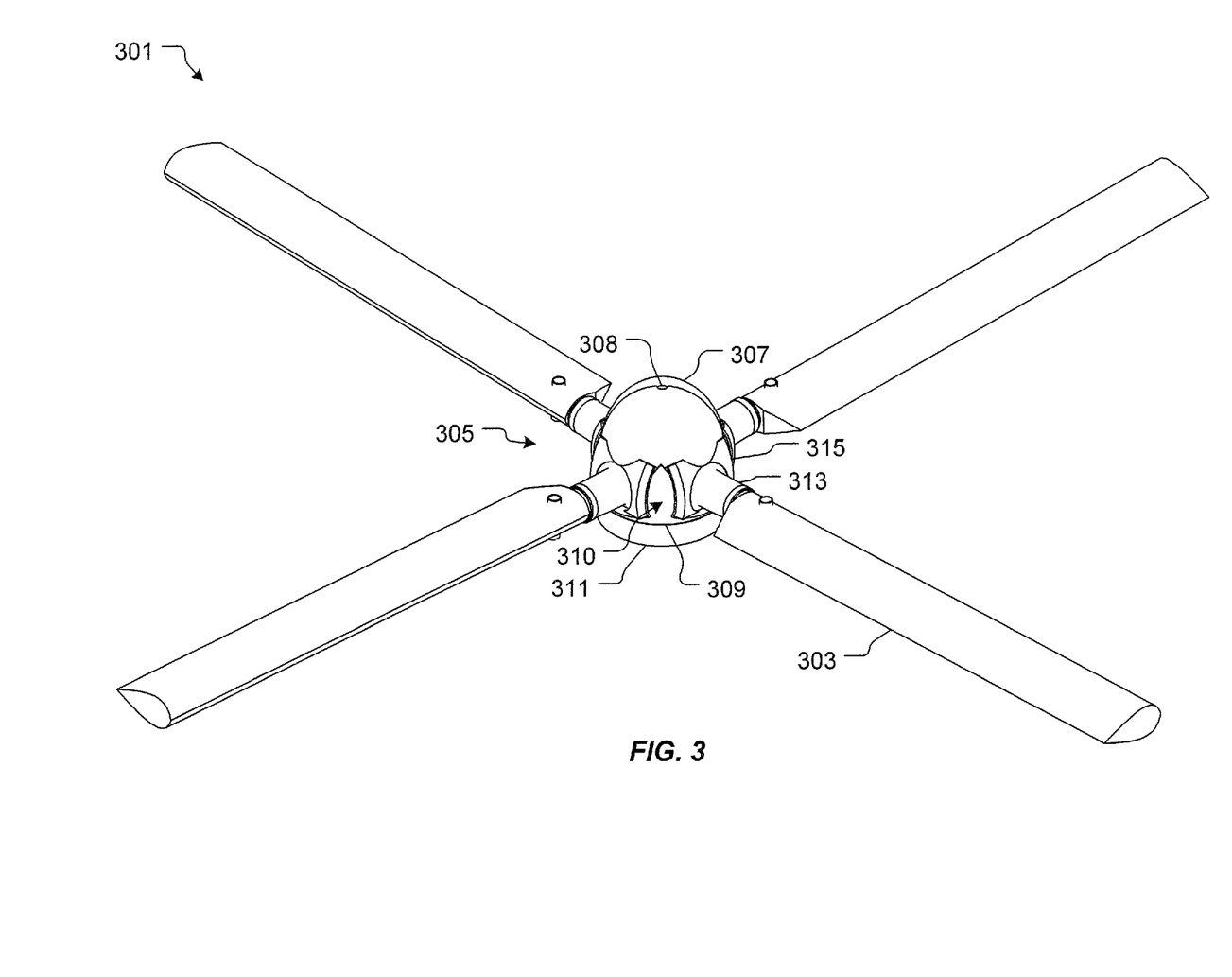
FIG. 3 is an oblique view of the rotary system of the present application.

Referring specifically to FIG. 3 in the drawings, rotary system 301 comprises a plurality of rotor blades 303 operably associated with a hub assembly 305. During operation, an aircraft engine (not shown) drives and rotates hub assembly 305, which in turn creates flight via rotor blades 303. In the exemplary embodiment, rotary system 301 is shown having four rotor blades 303; however, it will be appreciated that the features of rotary system 301 discussed herein could easily be adapted for use with more or less rotor blades, depending on the desired embodiment. For ease of description, one of the four blades 303 and devices operably associated therewith are discussed in detail. However, it should be understood that the remaining three blades and associated components are substantially similar in form and function to blade 303 and include the features discussed herein.

Hub assembly 305 is preferably provided with a spinner 307 that securely attaches to a housing 309. Both spinner 307 and housing 309 are rotatably positioned above a non-rotating nacelle lip 311 at a spaced relationship therebetween. During flight, spinner 307 diverts air towards rotor blades 303, thereby increasing the aerodynamic efficiency of rotary system 301. In some embodiments, spinner 307 could include an optional inlet 308 for allowing air to pass into housing 309. This feature provides an efficient cooling means for the devices housed within housing 309.

In the preferred embodiment, housing 309 is configured to securely support rotor blade 303 thereto and to house one or more of the components of hub assembly 305 therein. Housing 309 is also adapted to support a plurality of hollow yoke arms 313 configured to receive a hollow spindle section of blade 303. Further discussion of these features is provided below with respect to at least FIG. 8.

Figure 8:
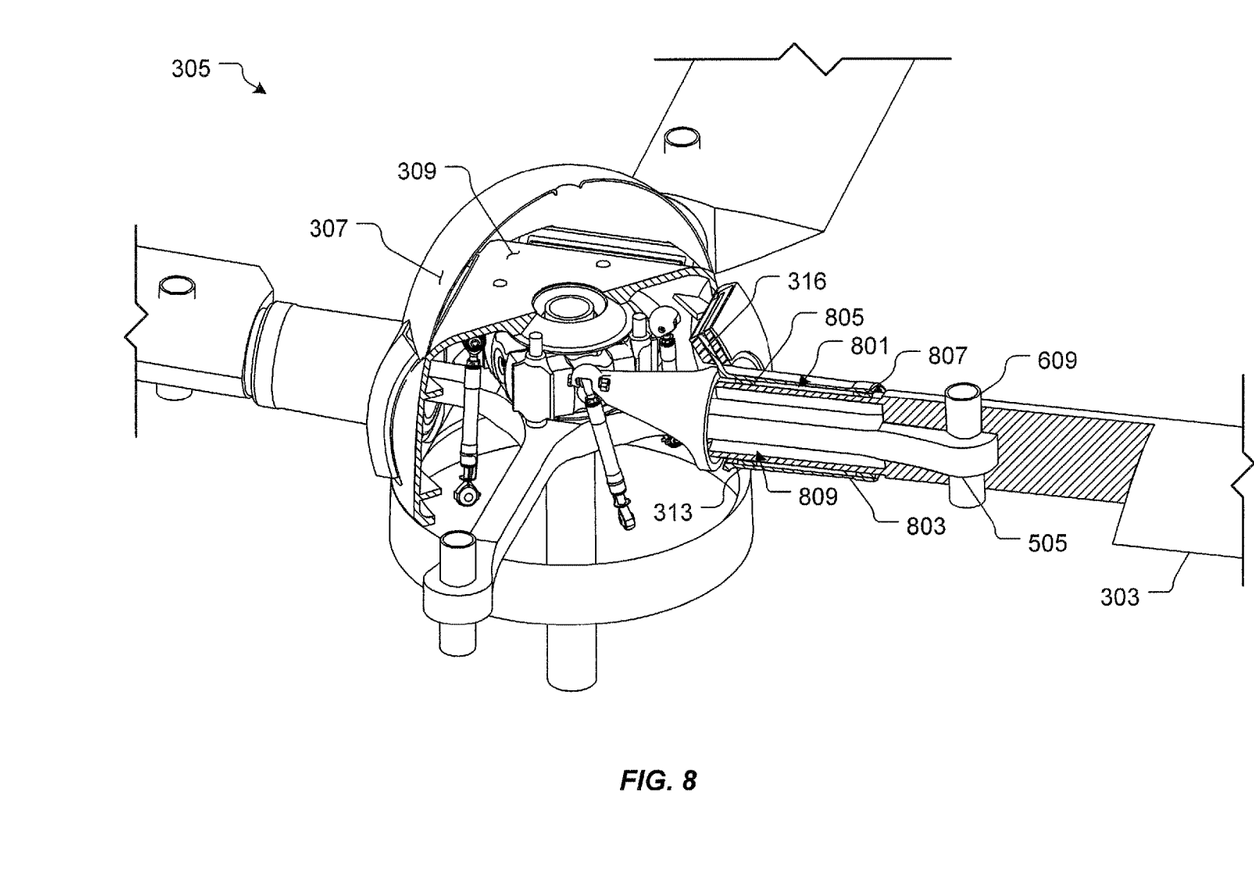
FIG. 8 is an oblique view of the rotary system of FIG. 7.

Hub assembly 305 is optionally provided with an elastomeric coning element 315 operably associated with yoke arm 313. During operation, coning element compensates for the coning forces exerted against hub assembly 305 by rotor blades 303. Coning element 315 is preferably manufactured with an elastomeric material that elastically extends in the coning direction of the rotor blades during flight. Coning element 315 preferably bonds to an outer surface 310 of housing 309 and peripherally extends around at least a portion of the outer perimeter of yoke arm 313; however, alternative embodiments of element 315 could include different contouring and be positioned alongside any surface of arm 313. As is shown in FIG. 8, element 315 is configured to sandwich a flange 316 of yoke arm 313 therebetween. This feature allows the yoke arm to pivot as the rotor blades cone during flight.

Figure 4:
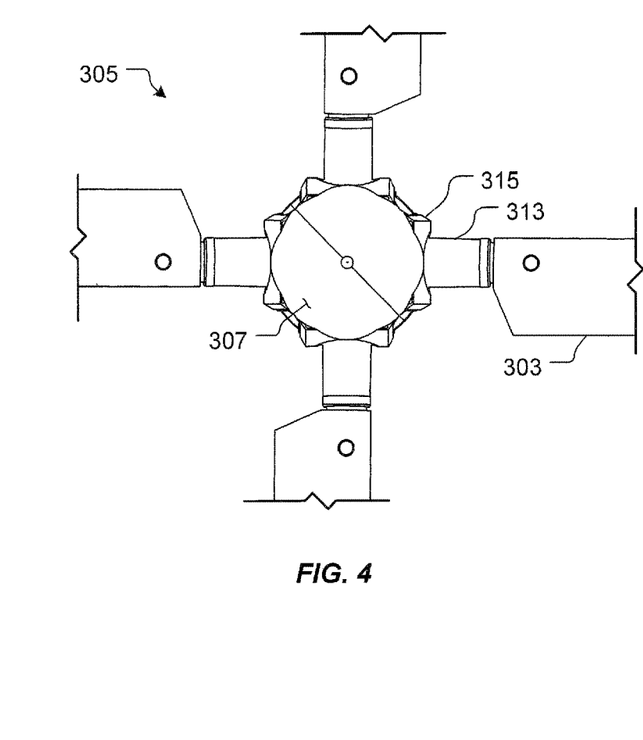
FIG. 4 is a top view of the rotary system of FIG. 3.
Figure 5:
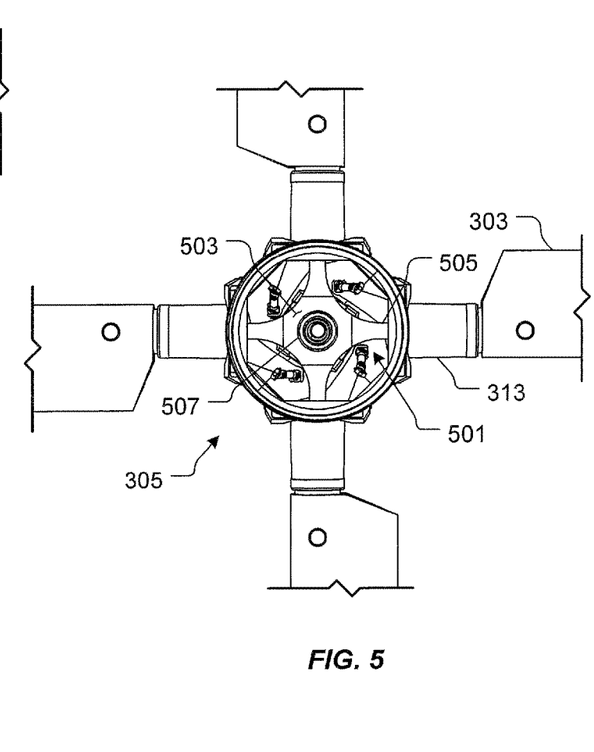
FIG. 5 is a bottom view of the rotary system of FIG. 3.

In FIGS. 4 and 5, respective top and bottom views of hub assembly 305 are shown. Hub assembly 305 is provided with a tension-torsion strap 501 for controlling both centrifugal and feathering forces exerted against the hub assembly 305 during flight. It will be appreciated that strap 501 could also control lead/lag and flapping movement of the rotor blades during flight. During operation, strap 501 allows for torsion (twisting) movement caused by blade feathering, and restricts tension (longitudinal) movement caused by blade centrifugal forces.

The tension-torsion strap 501 preferably comprises a base portion 503 having a plurality of strap arms 505 extending therefrom. Strap arms 505 extend through hollow yoke arm 313 and provide effective means for attaching rotor blades 303 to hub assembly 305. Base portion 503 includes a center hole for allowing the rotor mast 507 to pass therethrough. It should be understood that in the preferred embedment, tension-torsion strap 501 attaches to a constant velocity (CV) joint and not directly to rotor mast 507.

Figure 6A:
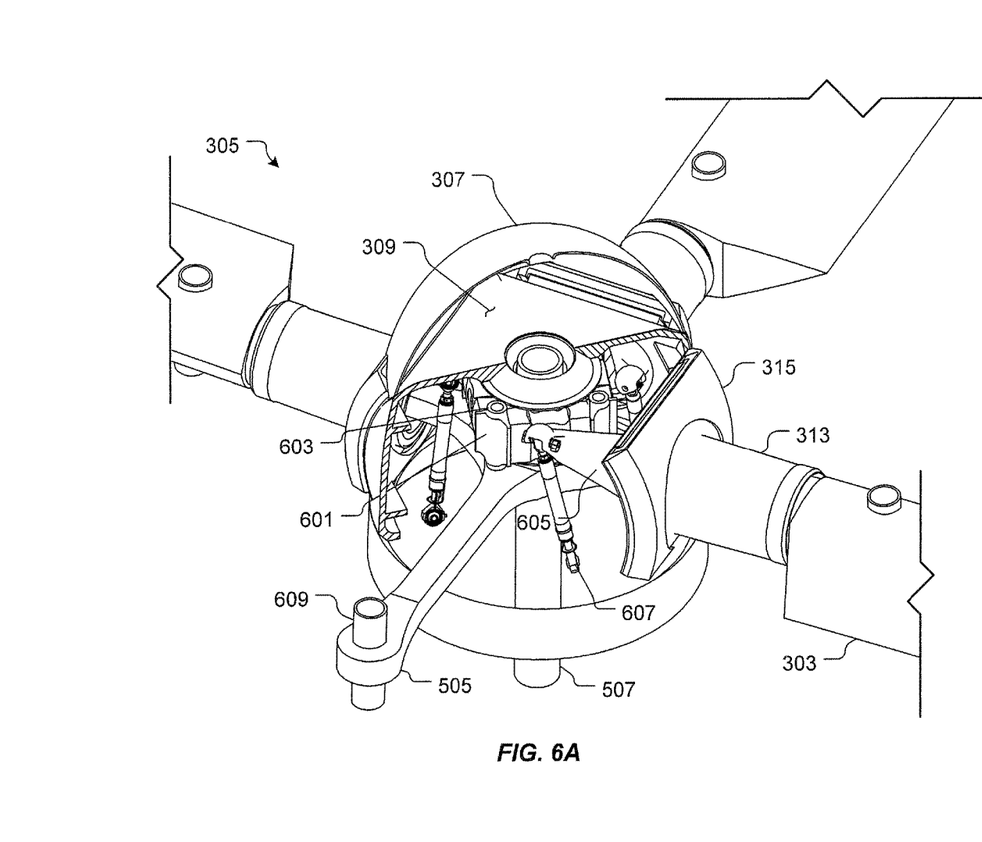
FIG. 6A is an oblique partially cutout view of the rotary system of FIG. 3.

In FIG. 6A, an oblique view of hub assembly 305 is shown, and for viewing and descriptive clarity, a portion of hub assembly 305 is removed. Hub assembly 305 is provided with a CV joint 601 disposed within housing 309 and securely attached thereto via one or more fastening means 603. It will be appreciated that fastening means 603 also secures strap 501 to CV joint 601. When assembled, rotor mast 507 supports and rotates housing 309, CV joint 601, and strap 501, which in turn rotates blades 303.

FIG. 6A also clearly depicts hub assembly 305 having a pitch horn 605 operably associated with rotor blades 303 and pivotally connected to a pitch link 607. It will be appreciated that the pitch horn is selectively angled to fit within housing 309. During operation, pitch link 607 manipulates the pitch horn 605 via a swashplate (not shown). It should be understood that the pitch links and horns of hub assembly 305 are utilized to change the pitching angle of the rotor blades during flight.

Figure 6B:
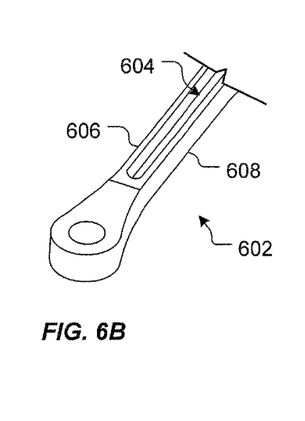
FIG. 6B is an oblique partial view of an alternative embodiment of a tension-torsion strap of the rotary system of FIG. 6A

As discussed briefly above, tension-torsion strap 501 is an effective means for controlling blade feathering and centrifugal forces. In the preferred embodiment, tension-torsion strap 501 is composed of a plurality of stacked fiberglass layers, which allows twisting movement to compensate for the feathering forces, but yet has a high tensile strength to prevent excessive stretching, thus compensating for blade centrifugal forces. Of course, it should be understood that tension-torsion strap 501 could easily be manufactured in different shapes, sizes, and material in alternative embodiments. For example, FIG. 6B illustrates an alternative embodiment, which is a tension-torsion strap 602 manufactured with a hollow section 604 that creates two longitudinal members 606 and 608 extending alongside and at a distance relative to each other. These features allow for a desired twisting movement, but yet restrict stretching. Strap 602 has at least one advantage over tension-torsion strap 501, namely, strap 602 is manufactured with less material, which reduces overall costs and weight of the aircraft.

Hub assembly 305 is further provided with a fastening means 609 for securing tension-torsion strap 501 to blade 303. In the preferred embodiment, fastening means 609 is a locking pin; however, it will be appreciated that alternative embodiments could include different types of fastening means for securing strap 501 to blade 303. FIG. 6A depicts fastening means 609 extending through the thickness of rotor blade 303 such that fastening means 609 remains exposed therefrom. However, alternative embodiments could include fastening means being configured to sit flush with the outer surface of the rotor blade or fastening means that remain disposed within the rotor blade.

Figure 7:
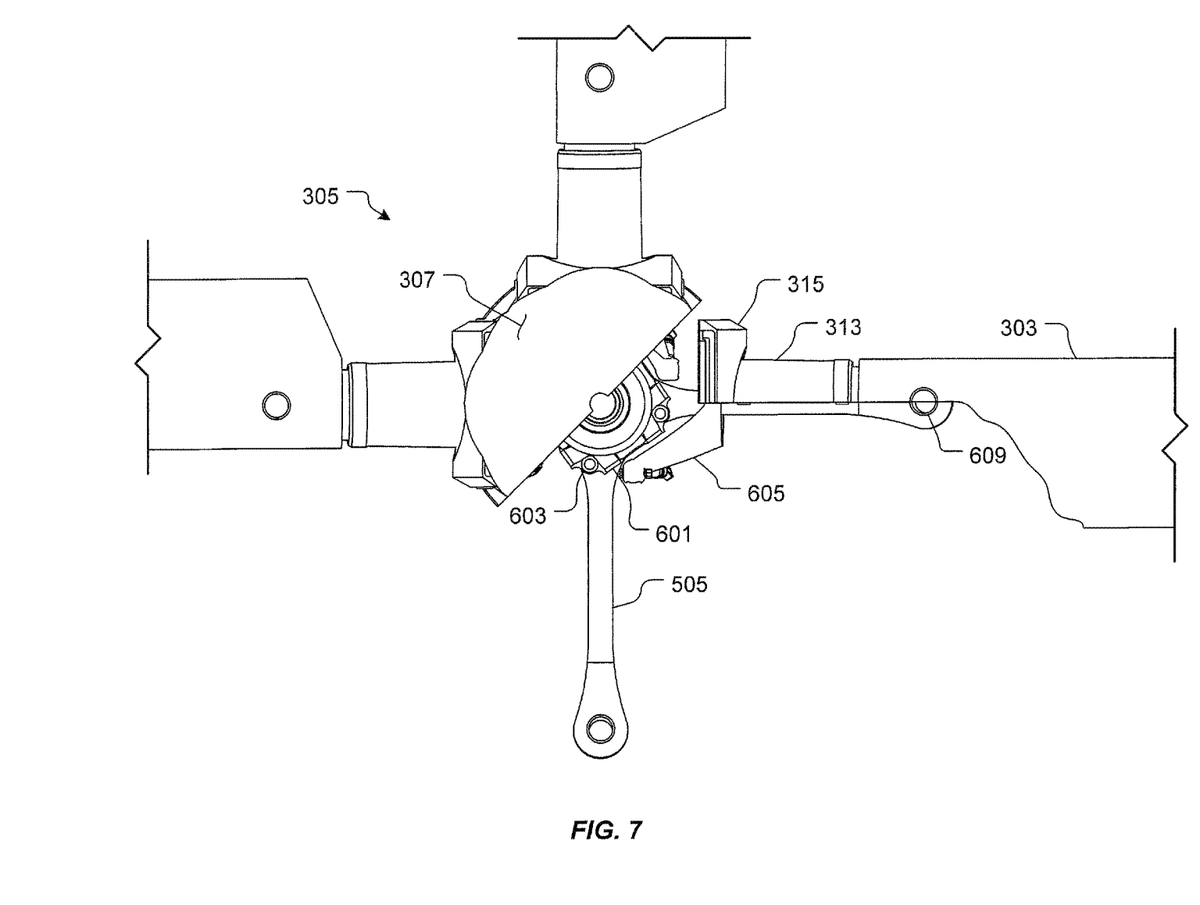
FIG. 7 is a top partially cutout view of the rotary system of FIG. 3.

Referring next to FIGS. 7 and 8, respective top and oblique views of hub assembly 305 are shown, and for viewing and descriptive clarity, a section of hub assembly 305 is removed. In FIG. 8, yoke arm 313 is shown having a hollow cavity 801 for receiving a hollow spindle section 803 of blade 303. When assembled, cavity 801 provides efficient means for spindle section 803 to rotate therein. A bearing assembly is utilized for allowing spindle section 803 to rotate within cavity 801. In particular, two roller bearings, a first bearing 805 and a second bearing 807 spaced at a distance apart from each other, provide efficient means for allowing rotational movement of the spindle section of the rotor blade relative to the yoke arm. Bearings 805 and 807 are preferably configured to extend the entire circumferential length of spindle section 803. Also, in the preferred embodiment, roller bearings 805 and 807 are ball bearings; however, different types of bearings could be used in alternative embodiments.

Spindle section 803 preferably includes a hollow cavity 809 for receiving tension-torsion strap 501 therethrough. It should be understood that without tension-torsion strap 501, spindle 803 would possibly have unrestricted rotational movement within cavity 801. Tension-torsion strap 501 allows some rotational movement of spindle section 803 within cavity 801 as blade 303 feathers during flight. It will be appreciated that the thickness, shape, contouring, and material composition of tension-torsion strap 501 could easily be altered in different embodiments to achieve a desired elastic torsion and tensile strength, thus providing different feathering compensations.

Figure 9:
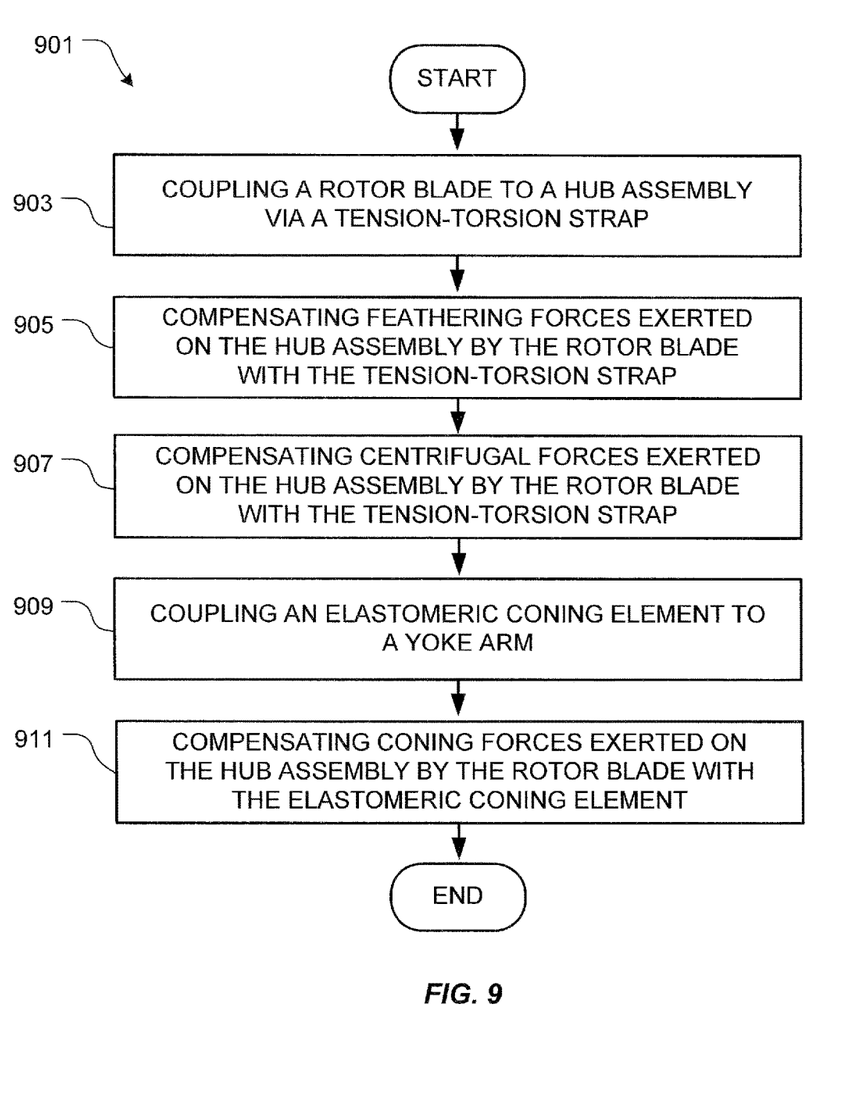
FIG. 9 is a flow chart depicting the preferred method.

In FIG. 9, a flowchart 901 depicting the preferred method is shown. Box 903 depicts the first step, which includes coupling a rotor blade to a hub assembly via a tension-torsion strap. Boxes 905 and 907 depict the process of compensating for centrifugal and feathering forces exerted against the hub assembly with the tension-torsion strap. The next steps, as depicted in boxes 909 and 911, are optional features that include the process of coupling an elastomeric element to a yoke arm associated with the rotor blade for compensating blade coning forces.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary system for a rotary aircraft, comprising:
   a rotor mast;
   a constant velocity joint;
   a rotor blade having a hollow spindle section; and
   a hub assembly rotatably attached to the rotor mast and operably associated with the rotor blade, the hub assembly having:
      a housing attached to the rotor mast and attached to the constant velocity joint;
      a spinner configured to divert air to the rotor blade during flight, the spinner being positioned above the housing and having an inlet extending through a thickness of the spinner, the inlet being configured to allow air to pass therethrough to the housing;
      a hollow yoke arm having a flange and forming a hollow cavity, the hollow yoke arm being configured to receive the hollow spindle section of the rotor blade;
      a bearing assembly disposed within the hollow cavity of the hollow yoke arm and positioned between the hollow spindle section and the hollow yoke arm, the bearing assembly having:
         a first bearing; and
         a second bearing spaced at a distance relative to the first bearing;
      a coning element bonded to an outer surface of the housing, the coning element being configured to receive and sandwich the flange of the hollow yoke arm between an elastomeric material and configured to reduce a coning force exerted on the hollow yoke arm during flight; and
      a tension-torsion strap coupled to the constant velocity joint and coupled to the rotor blade, the tension-torsion strap being configured to extend through the hollow yoke arm and to extend through the hollow spindle section of the rotor blade;
   wherein the constant velocity joint is disposed within the housing;
   wherein the tension-torsion strap is fastened to the constant velocity joint;
   wherein the coning element peripherally extends around at least a portion of an outer perimeter of the hollow yoke arm;
   wherein the coning element enables the hollow yoke arm to pivot;
   wherein the spindle section pivots within the hollow yoke arm as a blade feathering force is exerted on the hub assembly via the rotor blade during flight; and
   wherein the tension-torsion strap restricts the pivoting movement of the rotor blade as the blade feathers during flight.

2. The rotary system of claim 1, wherein the tension-torsion strap is composed of an elastic material.

3. The rotary system of claim 2, wherein the tension-torsion strap is composed of fiberglass material.

4. The rotary system of claim 1, the tension-torsion strap comprising:
   a base portion coupled to the constant velocity joint via a fastening means; and
   a strap arm extending from the base and passes through the spindle section of the rotor blade.

5. The rotary system of claim 1, the tension-torsion strap comprising:
   a first longitudinal member; and
   a second longitudinal member extending alongside the first longitudinal member at a spaced relation therefrom.

6. The rotary system of claim 1, wherein the bearing assembly allows rotation of the spindle section relative to the hollow yoke arm.

7. The rotary system of claim 6, the bearing assembly comprising:
   a first roller bearing; and
   a second roller bearing;
   wherein the first roller bearing and the second roller bearing are positioned at a spaced distance relative to each other.

8. The rotary system of claim 7, wherein the first roller bearing peripherally extends the entire circumferential length of an outer surface of the spindle section; and wherein the second roller bearing peripherally extends the entire circumferential length of the outer surface of the spindle section.

9. A method to control centrifugal and feathering movement of a rotor blade relative to a hub assembly coupled thereto, the method comprising:
providing the rotary system of claim 1;
elastically attaching the hollow yoke arm to the coning element bonded to an outer surface of the housing rotatably coupled to the rotor mast;
reducing the coning force exerted on the hollow yoke arm during flight via the coning element;
receiving the spindle section of the rotor blade in the hollow yoke arm;
securing a first end of the tension-torsion strap to the housing;
extending the tension-torsion strap through the hollow yoke arm; and
coupling a second end of the tension-torsion strap to the spindle section of the rotor blade;
wherein the coning element peripherally extends around at least a portion of an outer perimeter of the hollow yoke arm;
wherein the coning element enables the hollow yoke arm to pivot;
wherein the rotor blade pivots within the hollow yoke arm; and
wherein the tension-torsion strap controls the pivoting movement of the rotor blade during flight.

10. The method of claim 9, further comprising:
controlling a rotor blade coning force with an elastomeric element operably associated with the yoke arm.

11. The method of claim 9, further comprising:
attaching the rotor blade to the hollow yoke arm with a bearing assembly;
wherein the bearing assembly allows pivoting movement of the rotor blade relative to the hollow yoke arm.

12. A rotary system for a rotary aircraft, comprising:
a rotor blade having:
    a hollow spindle section;
a hub assembly having:
    a housing;
    a hollow yoke arm having a flange and forming a hollow cavity and configured to receive the hollow spindle section therein;
    a bearing assembly disposed within the hollow cavity of the hollow yoke arm and positioned between the hollow spindle section and the hollow yoke arm, the bearing assembly having:
        a first bearing; and
        a second bearing spaced at a distance relative to the first bearing;
    a coning element bonded to an outer surface of the housing, the coning element being configured to sandwich the flange of the hollow yoke arm between an elastomeric material and configured to reduce a coning force exerted on the hollow yoke arm during flight; and
    a tension-torsion strap, comprising;
        a first longitudinal member;
        a second longitudinal member extending alongside the first longitudinal member; and
        a gap located between the first longitudinal member and the second longitudinal member, the tension-torsion strap coupled to both the rotor blade and the hub assembly;
wherein the coning element peripherally extends around at least a portion of an outer perimeter of the hollow yoke arm;
wherein the coning element enables the hollow yoke arm to pivot;
wherein the spindle section pivots within the hollow yoke arm; and
wherein the tension-torsion strap controls the pivoting movement of the spindle caused by feathering movement of the rotor blade during flight.

13. The rotary system of claim 12, wherein the bearing assembly allows the spindle section to pivot relative to the hollow yoke arm.

14. The rotary system of claim 13, the bearing assembly comprising:
a first roller bearing; and
a second roller bearing;
wherein the first roller bearing and the second roller bearing are positioned at a spaced distance relative to each other.

15. The rotary system of claim 12, the tension-torsion strap comprising:
a base; and
an arm attached to and extending from the base;
wherein the arm extends through the spindle section and attaches the rotor to the hub assembly.

16. The rotary system of claim 12, the spindle section having:
a hollow cavity;
wherein the tension-torsion strap passes through the hollow cavity.

* * * * *